April 20, 1943.  P. A. KINZIE  2,317,275
HYDRAULIC MOTOR GEAR
Filed June 9, 1941   2 Sheets-Sheet 1
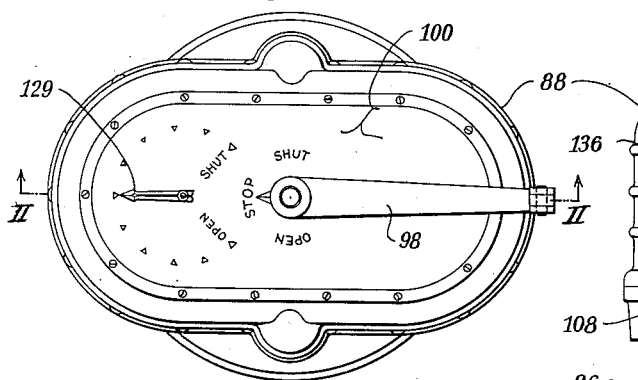
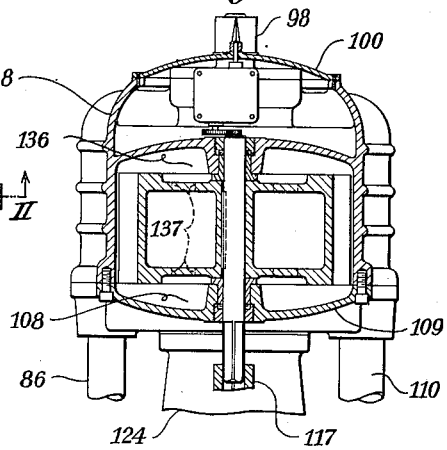
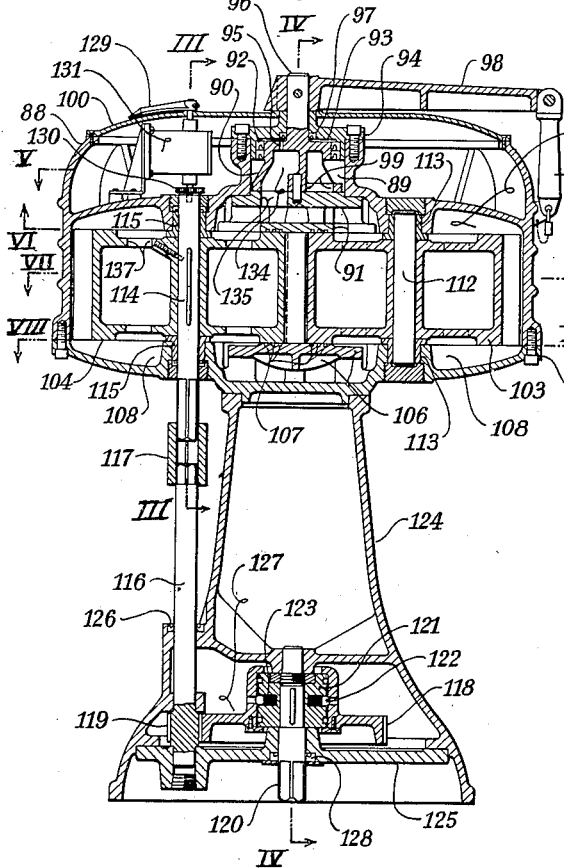
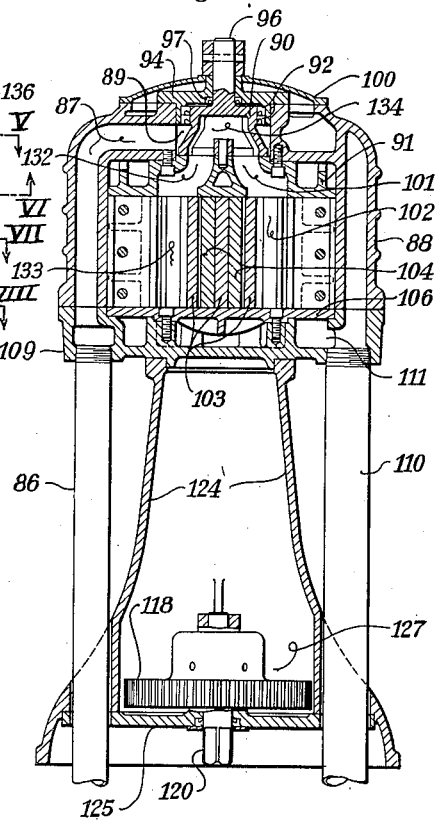
INVENTOR.
PHILLIP A. KINZIE
BY Henry L. Jennings
ATTORNEY April 20, 1943. P. A. KINZIE 2,317,275
HYDRAULIC MOTOR GEAR
Filed June 9, 1941 2 Sheets-Sheet 2

INVENTOR.
PHILLIP A. KINZIE
BY Henry L. Jennings
ATTORNEY

Patented Apr. 20, 1943

2,317,275

UNITED STATES PATENT OFFICE 2,317,275

HYDRAULIC MOTOR GEAR

Phillip A. Kinzie, Denver, Colo.

Original application May 31, 1939, Serial No. 276,593. Divided and this application June 9, 1941, Serial No. 397,346

6 Claims. (Cl. 74—434)

The present invention is a division of my copending application, Serial No. 276,593, filed May 31, 1939.

My invention relates to hydraulic motors, and has for an object the provision of a hydraulic motor wherein fluid pressure is translated into rotary motion by means of its action on a pair of meshed gears.

Another object of my invention is to provide an improved hydraulic motor adapted for opening and closing tube valves and the like.

A further object of my invention is to provide a hydraulic motor embodying a simple and efficient arrangement of ports and control valves for supplying fluid under pressure to the set of meshed gears which translate the pressure into rotational force.

Another object of my invention is to provide a simple means for confining fluid pressure to a limited area of the meshed gears, said means to comprise sealing elements at the periphery and ends of the meshed gears.

Another object of my invention is the provision of an integrally contained controlling means for directing the fluid to the meshed gears; said means to be capable of so directing fluid flow that reversal of rotation of the meshed gearing can be effected.

Another object of my invention is the provision of a mechanical torque limiting means, said means operating in an oil bath and contained within the hydraulic motor structure.

A further object is the provision of meshing gears in the hydraulically actuated drive unit having teeth so constructed that they are individually resilient, yet relatively rigid as a unit of the gear.

A further object is to provide gear members for a hydraulically actuated drive unit, wherein the tooth elements thereof are molded of a resilient material, such as rubber, around a rigid metallic framework.

A still further object is to provide a construction of the gear members for the hydraulic motor, wherein the tooth elements thereof are molded of a resilient material, such as rubber, integrally with a rigid metallic framework, and wherein the contacting surfaces of the tooth elements are faced with metallic elements anchored in the resilient teeth.

Apparatus embodying features of my invention is illustrated in the accompanying drawings forming a part of this application, in which Fig. 1 is a plan view of my hydraulic gear motor;

Fig. 2 is a section taken on the plane II—II of Fig. 1;

Fig. 3 is a section taken on the plane III—III of Fig. 2;

Fig. 4 is a section taken on the plane IV—IV of Fig. 2;

Figure 5:
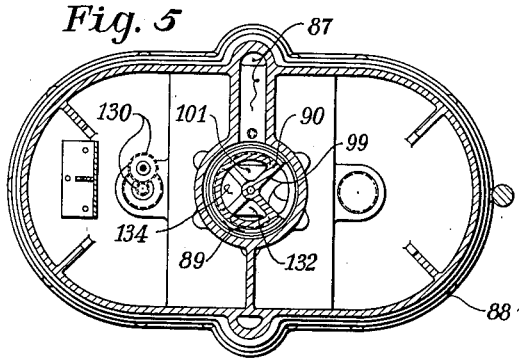
Fig. 5 is a section taken on the plane V—V of Fig. 2.
Figure 7:
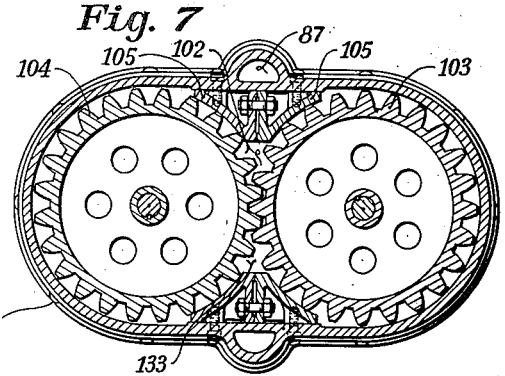
Fig. 7 is a section taken on the plane VII—VII of Fig. 2.
Figure 6:
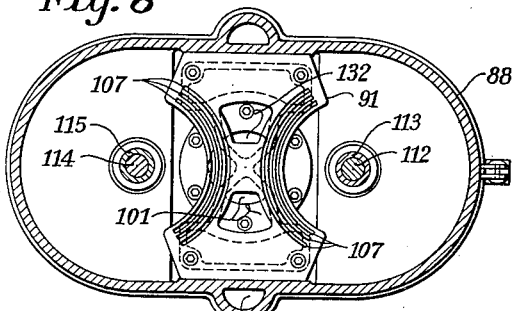
Fig. 6 is a section taken on the plane VI—VI of Fig. 2.
Figure 8:
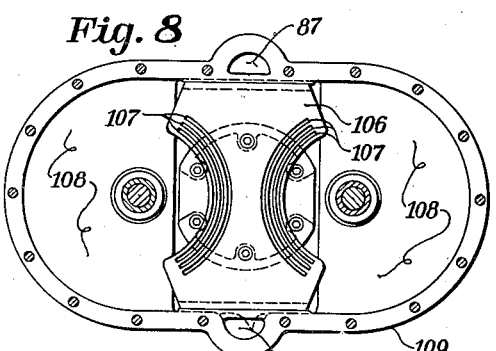
Fig. 8 is a section taken on the plane VIII—VIII of Fig. 2.
Figure 9:
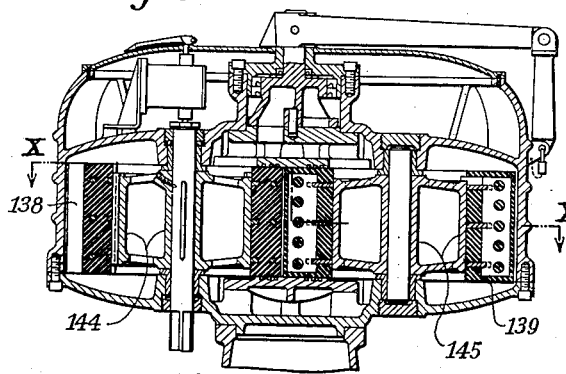
Fig. 9 is a section analogous to Fig. 2, but showing an alternate embodiment of the invention.
Figures 12, 13:
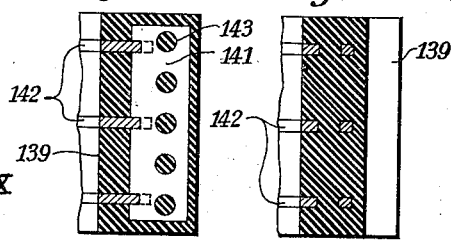
Fig. 12 is a section taken on the plane XII—XII of Fig. 11.
Fig. 13 is a section taken on the plane XIII—XIII of Fig. 11.
Figure 10:
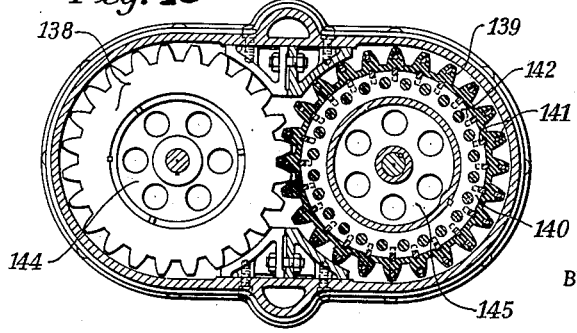
Fig. 10 is a section taken on the plane X—X of Fig. 9.

Referring to the drawings for a better understanding of my invention, it will become apparent that the principle of operation employed is essentially a reversal of the conditions of operation of a gear pump; that is, pressure is admitted to cause rotation of the gear units instead of rotation of the gear units being used to produce pressure.

This motor is actuated by pressure admitted through the pipe 86 to the passageway 87 in the body 88, whence it passes into the annular space 89 surrounding the control valve 90, which is held in tight contact with the upper liner 91 by virtue of the differential in diameters between the lower and upper portions thereof. The upper portion is provided with the seal rings 92, and the annular space 93 between the upper surface of the control valve 99 and cover 94 is relieved to the drain through the hole 95. The upwardly extending trunnion 96, which is sealed by the ring 97 and to which the control lever 98 is attached, provides a means for actuating the control valve 90. With the lever 98 in the position shown, pressure in the annular space 89 can not escape since no port is in communication with the triangular shaped port 99; however, when the control lever handle which is normally locked in the stop position, is unlocked and swung upright, the lever 98 can then be swung to either the "open" or "shut" positions indicated on the top cover and dial plate 100. For the purpose of further description it will be assumed that it has been swung to the open position.

With the control valve 90 in this position, the triangular shaped port 99 will be placed in communication with a mating opening which communicates with the passageway 101. The passageway 101 will then deliver fluid under pressure to the space 102, where it will act upon the gears 103 and 104. Since there will be in effect one tooth area upon which the fluid pressure will not be balanced, the gear 103 will rotate clockwise, and the gear 104 will rotate counterclockwise. The space 102 is sealed against pressure loss by contact with the gears of the segmental shields 105, and the upper liner 91 and lower liner 106 in which the resistance grooves 107 are cut.

As the gears 103 and 104 rotate to the point where the lower liner 106 no longer seals the space between the teeth on the gears, the fluid therein will flow downward into the basin space 108 formed by the bottom cover 109, and will be delivered to the drain pipe 110 through the port 111.

The rotational force imparted on the gear 103, which has its shaft 112 journalled in the bushings 113 will be transmitted to the gear 104 through the meshed teeth on gears 103 and 104. The combined rotational forces of both gears will then be transmitted to the gear shaft 114, which is keyed to the gear 104 and which is journalled in the bushings 115.

The pinion shaft 116, which is connected to the gear shaft 114 by the coupling 117, will transmit the rotational force from the gears 103 and 104 to the spur gear 118 through the integral spur pinion 119 cut thereon. The torque from the spur gear 118 is transmitted to the drive shaft 120 through the clutch hub 121 which is keyed and clamped thereon and which is held in engagement with the spur gear by the balls 122 being thrust outward into the drilled holes in the spur gear hub by the springs 123.

The drive shaft 120 is journalled in the pedestal 124 and gear cover 125, as in the pinion shaft 116. The seal 126 on the pinion shaft 116 prevents entrance of fluid into the oil reservoir 127 in the pedestal 124 while the seal 128 prevents the escape of oil from the oil reservoir.

The position indication for the driven unit is shown on the top cover and dial plate 100 by the pointer 129, which is driven by the gear shaft 114 through appropriate gearing 130 and the speed reducer 131.

It will be noted that the coupling 117 can be slipped upward and that a wrench can be slipped between the gap between the gear and pinion shafts 114 and 116 to manually operate the drive shaft as an emergency measure in the event that the gear unit should be rendered inoperative because of lack of, or insufficient fluid pressure.

To reverse the direction of rotation the control lever 98 would be swung to the "close" position. This action would admit pressure through the triangular shaped port 99 to the passageway 132, whence it would be delivered to the space 133. Since the action of the pressure in this space upon the gears 103 and 104 would be the same as that previously described, except that the unbalance tooth area would be reversed, it is evident that reversal of the direction of rotation would occur.

It will be noticed that the fluid filling the space between the gear teeth, which would have to be displaced upon reversal of the unit, is free to be displaced through the passageway 101 to the space 134 in the control valve 90, whence it can pass through the port 135 in the upper liner 91. Since the space 136 above the gears 103 and 104 is in communication with the space 108 beneath the gears through the clearance around the gears and the cored holes 137, the displaced fluid can be discharged through the drain pipe 110.

Since the two alternatives shown in Figs. 9 to 14 inclusive involve no change in function but only a change in structure of parts, it will be assumed that the foregoing description is applicable to their operation and that unless parts are specifically described as being different, they are identical.

On the first alternate, shown in Figs. 9 to 13 inclusive, the gear rims 138 and 139 are made of rubber or some rubber like compound; and are molded integral with a metal skeleton 140 to give them rigidity. The vertical members 141, as well as the horizontal circular members 142, are perforated with holes 143, into which the resilient material flows during the vulcanization process to insure good bonding of the covering with the metal skeleton 140.

The skeleton is so constructed that the vertical and horizontal members would be interlocking, and the members welded together as a unit before the rubber covering is vulcanized thereon. It will be noted that the vertically extending members 141 are spaced around the periphery of the horizontal members 142 so as to form reinforcing members for each gear tooth. With this type of construction the only loads imposed upon the rubber are compression loads which are immediately transmitted to the rigid metal skeleton 140. Since the units are keyed to the hub members 144 and 145, it is apparent that this embodiment will operate in the same manner as the embodiment previously described.

Figures 11, 14:
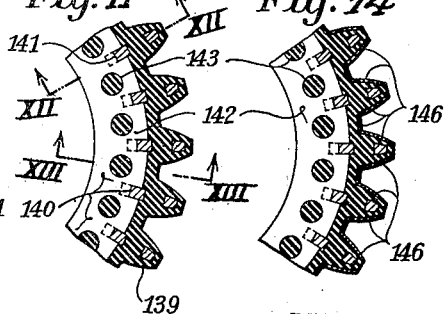
Fig. 11 is an enlarged fragment of Fig. 10.
Fig. 14 is a fragmentary section, analogous to Fig. 11, and shows an alternate embodiment.

The alternate shown on Fig. 14 is the same as the one just described, except that metallic facings 146 with appropriate anchorage means are molded on the contacting surfaces of the gear teeth.

The purpose for the using of gears of a resilient material is this: in certain installations where water is the pressure medium for actuation of the drive unit, it may contain a rather high percentage of minerals in solution which tend to collect on the surfaces with which it comes in contact. Since the clearances between the gear teeth must be quite close, it is evident that any appreciable scaling or encrustation on a solid metallic gear could and probably would so decrease the clearance that the gears would no longer operate but would jam. However, by using a resilient material such as rubber, if scale did collect, the action of the gears would not be stopped since the teeth could and would deform to accommodate for the decreased clearances caused by scale accumulation; and further, this action of deforming would chip off the inelastic scale and thereby return the action of the gearing to normal.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. A gear adapted for use in hydraulic motors of the character described comprising a metallic skeleton framework having horizontal and vertical members secured together, said vertical members being spaced around the periphery of the framework to form reinforcing members for gear teeth, and a resilient material secured to the periphery of the framework to form teeth and intermediate grooves.

2. A gear according to claim 1, in which the horizontal and vertical members are provided with perforations into which the resilient material enters, thereby to bond the resilient material mechanically to the framework.

3. A gear for use in hydraulic motors of the character described comprising a perforated metallic skeleton framework having horizontal and vertical members secured together, said vertical members being spaced around the periphery of the framework to form reinforcing members for gear teeth, a layer of resilient material forming teeth and intermediate grooves secured to the periphery of the framework and filling the perforations thereof, and a metallic covering bonded to said teeth and intermediate grooves.

4. A rotor for hydraulic motors of the gear type comprising a plurality of perforated disk members axially spaced with respect to each other, a plurality of perforated axially extending plates cooperating with the disk members and radially spaced with respect to each other and forming with the disk members a skeleton framework for the rotor, and a plastic resilient material molded about the framework filling the perforations and forming a resilient periphery for the rotor bonded to the framework.

5. A rotor for hydraulic motors of the gear type comprising a plurality of axially spaced perforated disk members having radially extending notches therein spaced corresponding to the teeth of the rotor, perforated axially extending plates each having one edge fitting into corresponding notches in the plates, said disk members and plates forming a skeleton framework for the rotor, and a plastic resilient material molded about the framework and filling the perforations to form reinforced resilient gear teeth around the rotor bonded to the framework.

6. A gear of the character described comprising a plurality of perforated disks, cooperating perforated axially extending plates forming a metallic skeleton framework, a resilient material molded to said framework and filling said perforations and forming gear teeth and intermediate grooves, and a metallic covering for the working sides of the teeth and grooves.

PHILLIP A. KINZIE.